(12) United States Patent
Ito et al.

(10) Patent No.: US 7,251,602 B2
(45) Date of Patent: Jul. 31, 2007

(54) VOICE BROWSER SYSTEM

(75) Inventors: Fumiaki Ito, Kanagawa (JP); Yuji Ikeda, Kanagawa (JP); Takaya Ueda, Kanagawa (JP); Kenichi Fujii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 09/817,345

(22) Filed: Mar. 27, 2001

(65) Prior Publication Data

US 2001/0049604 A1    Dec. 6, 2001

(30) Foreign Application Priority Data

Mar. 31, 2000  (JP)  ............................... 2000-099418

(51) Int. Cl.
*G10L 21/00*  (2006.01)
(52) U.S. Cl. ....................... 704/270; 704/258; 704/260
(58) Field of Classification Search ................ 704/275, 704/270.1, 258, 260, 251, 231, 257, 259, 704/266, 270; 709/219, 206, 218
See application file for complete search history.

(56) References Cited

U.S. PATENT DOCUMENTS

| 5,884,262 | A | * | 3/1999 | Wise et al. ............... 704/270.1 |
| 5,915,001 | A | * | 6/1999 | Uppaluru ................. 379/88.22 |
| 6,094,677 | A | * | 7/2000 | Capek et al. ............... 709/219 |
| 6,240,448 | B1 | * | 5/2001 | Imielinski et al. .......... 709/218 |
| 6,249,764 | B1 | | 6/2001 | Kamae et al. ............ 704/270.1 |
| 6,269,336 | B1 | * | 7/2001 | Ladd et al. ................ 704/270 |
| 6,400,806 | B1 | * | 6/2002 | Uppaluru ................ 379/88.02 |
| 6,510,413 | B1 | * | 1/2003 | Walker ...................... 704/258 |

FOREIGN PATENT DOCUMENTS

EP    0 878 948 A2    11/1998

(Continued)

OTHER PUBLICATIONS

Kazuhiro, Kondo et al., "*A WWW Browser Using Speech Recognition And Its Evaluation,*" Systems and Computers in Japan, Scripta Technica Journals, vol. 29, No. 10 (Sep. 1, 1998), New York, USA, pp. 57-66, XP000786722, ISSN: 0882-1666.

(Continued)

*Primary Examiner*—V. Paul Harper
*Assistant Examiner*—Huyen X. Vo
(74) *Attorney, Agent, or Firm*—Fitzpatrick, Cella, Harper & Scinto

(57) ABSTRACT

To provide a browser apparatus with the contents of data provided on a network in a form of voice data, voice data indicating a part or the whole of the contents of the data provided on the network is formed and stored on a gateway, on the basis of the data. Data is formed by adding to the data provided on the network an identifier <VOICEOUT . . . > indicating a location where the voice data is stored. This data is provided to the browser apparatus. The browser apparatus receives the voice data from the location indicated by the identifier.

8 Claims, 9 Drawing Sheets

FOREIGN PATENT DOCUMENTS

| | | |
|---|---|---|
| EP | 878948 A2 * | 11/1998 |
| JP | 10-124293 | 5/1998 |
| JP | 10-154063 | 6/1998 |
| JP | 11-110186 | 4/1999 |
| JP | 11-161465 | 6/1999 |
| JP | 11-282648 | 10/1999 |
| WO | WO 97/23973 | 7/1997 |
| WO | WO 00/05708 | 2/2000 |

OTHER PUBLICATIONS

Bayer, S, "*Embedding Speech in Web Interfaces,*" Proceedings ICSLP 96, Fourth International Conference on Spoken Language Processing (CAT. No. 96TH8206), Philadelphia, PA, USA, (Oct. 6, 1996), vol. 3, pp. 1684-1687, XP002179708.

* cited by examiner

FIG. 3

```
POST http://gateway/voicein  HTTP/1.0

(PCM DATA)
```

FIG. 4

```
HTTP/1.0 200 OK
Content-type:text/html

<HTML> <HEAD> <TITLE> Top </TITLE> </HEAD>< BODY>
<P> SELECT PRODUCT TYPE </P>
<FORM action="/cgil"method="get">
    PRODUCT TYPE <SELECT name="category">
    <OPTION value="copy"> COPY
    <OPTION value="printer"selected> PRINTER
    <OPTION value="fax"> FAX
    </SELECT> <BR>
    <INPUT type="submit" value="DISPLAY">
</FROM>
<VOICEOUT href="http://gateway/out.wav">
<VOICEIN action="http://gateway/voicein">
</BODY> </HTML>
```

FIG. 7

```
HTTP/1.0 200 OK
Content-type:text/html

<HTML> <HEAD> <TITLE> Top </TITLE> </HEAD>< BODY>
<P> SELECT PRODUCT TYPE </P>
<FORM action="/cgil"method="get">
    PRODUCT TYPE <SELECT name="category">
    <OPTION value="copy"> COPY
    <OPTION value="printer"selected> PRINTER
    <OPTION value="fax"> FAX
    </SELECT> <BR>
    <INPUT type="submit" value="DISPLAY">
</FROM>
</BODY> </HTML>
```

FIG. 8

| COPY | http://server/cgil?category=copy |
|---|---|
| PRINTER | http://server/cgil?category=printer |
| FAX | http://server/cgil?category=fax |

801 / 802

VOICE BROWSER SYSTEM

FIELD OF THE INVENTION

The present invention relates to a browser system and the like which realize input/output of information performed between a server and a client via a network by using voices on the client side.

BACKGROUND OF THE INVENTION

An example of conventional voice browser systems having a voice input/output function is a voice-controllable computer proposed in Japanese Patent Laid-Open No. 10-124293 by which a client performs voice synthesis and voice recognition. Unfortunately, a voice browser system having this configuration has the problem that when a client is implemented by hardware such as a portable terminal having small calculation resources, the processing load on the client is too large compared to the resources.

Accordingly, voice browser systems which synthesize and recognize voices by using hardware different from hardware for implementing a client have been invented. An example is a browser system or a voice proxy server proposed in Japanese Patent Laid-Open No. 11-110186.

In the above conventional voice browser system, however, a browser process for displaying data described in a markup language such as HTML is separated from a process for outputting and inputting voices by voice synthesis and voice recognition. Therefore, between hardware for performing voice synthesis and voice recognition and hardware for implementing a client, communication for exchanging voice output data and voice input data must be performed in addition to communication accomplished by HTTP or the like to exchange data described in HTML or the like.

This requires complicated communication control and control for synchronizing the individual processes and hence makes the construction of a voice browser system difficult. In addition, a fire wall which prohibits communication except for HTTP communication is often formed between a client and a server. Since no other communication is possible in this case, a voice browser system is difficult to construct.

SUMMARY OF THE INVENTION

It is, therefore, an object of the present invention to provide a data processing apparatus and method, browser system, browser apparatus, and recording medium capable of displaying data provided on a network and outputting or inputting a voice corresponding to that data in a common communication process.

According to the present invention, there is provided a data processing apparatus for providing a browser apparatus with the contents of data provided on a network in a form of voice data, comprising means for forming, on the basis of the data provided on the network, voice data indicating a part or the whole of the contents of the data, means for storing the formed voice data, means for forming data by adding to the data provided on the network an identifier indicating a location where the voice data is stored, and means for providing the browser apparatus with the data to which the identifier is added.

According to the present invention, there is provided a data processing apparatus for permitting a browser apparatus to respond by voice to data provided on a network, comprising means for checking whether the contents of the data provided on the network include a content requiring a response from the browser apparatus, means for forming data by adding to the data provided on the network an identifier indicating a recipient of the response sent by voice data from the browser apparatus, and means for providing the browser apparatus with the data to which the identifier is added.

According to the present invention, there is provided a browser system comprising a browser apparatus, a server for providing data to the browser apparatus via a network, and a data processing apparatus for providing the browser apparatus with the contents of data provided by the server in a form of voice data, wherein the data processing apparatus comprises means for forming, on the basis of the data provided by the server, voice data indicating a part or the whole of the contents of the data, means for storing the formed voice data, means for forming data by adding to the data provided by the server an identifier indicating a location where the voice data is stored, and means for providing the browser apparatus with the data to which the identifier is added, and the browser apparatus comprises means for acquiring the voice data from the location indicated by the identifier and outputting a voice related to the voice data.

According to the present invention, there is provided a browser system comprising a browser apparatus, a server for providing data to the browser apparatus via a network, and a data processing apparatus for permitting the browser apparatus to respond by voice to data provided by the server, wherein the data processing apparatus comprises means for checking whether the contents of the data provided on the network include a content requiring a response from the browser apparatus, means for forming data by adding to the data provided by the server an identifier indicating a recipient of the response sent by voice data from the browser apparatus, means for providing the browser apparatus with the data to which the identifier is added, recognizing means for performing voice recognition for voice data related to the response, when the voice data is supplied from the browser apparatus to the recipient, means for forming response data in a form suited to the server for receiving the response, on the basis of the result of recognition by the recognizing means, and means for providing the response data to the server, and the browser apparatus comprises means for inputting a voice, means for forming voice data on the basis of the input voice, and means for supplying the formed voice data to a recipient indicated by the identifier.

According to the present invention, there is provided a browser system comprising a browser apparatus, a server for providing data to the browser apparatus via a network, and a data processing apparatus for providing the contents of data provided by the server in a form of voice data to the browser apparatus, and permitting the browser apparatus to respond by voice to data provided by the server, wherein the data processing apparatus comprises means for forming, on the basis of the data provided by the server, voice data indicating a part or the whole of the contents of the data, means for storing the formed voice data, means for forming data by adding to the data provided by the server a first identifier indicating a location where the voice data is stored, means for providing the browser apparatus with the data to which the first identifier is added, means for checking whether the contents of the data provided by the server include a content requiring a response from the browser apparatus, means for forming data by adding to the data provided by the server a second identifier indicating a recipient of the response sent by voice data from the browser apparatus, means for providing the browser apparatus with the data to which the identifier is added, recognizing means for performing voice recognition for voice data related to the response, when the voice data is supplied from the browser apparatus to the recipient, means for forming response data in a form suited to the server for receiving the response, on the basis of the result of recognition by the recognizing means, and means for providing the response data to the server, and the browser apparatus comprises means for acquiring the voice data from the location indicated by first identifier and outputting a voice related to the voice data, means for inputting a voice, means for forming voice data on the basis of the input voice, and means for supplying the formed voice data to a recipient indicated by the second identifier.

According to the present invention, there is provided a data processing method of providing a browser apparatus with the contents of data provided on a network in a form of voice data, comprising the steps of forming, on the basis of the data provided on the network, voice data indicating a part or the whole of the contents of the data, storing the formed voice data, forming data by adding to the data provided on the network an identifier indicating a location where the voice data is stored, and providing the browser apparatus with the data to which the identifier is added.

According to the present invention, there is provided a data processing method of permitting a browser apparatus to respond by voice to data provided on a network, comprising the steps of checking whether the contents of the data provided on the network include a content requiring a response from the browser apparatus, forming data by adding to the data provided on the network an identifier indicating a recipient of the response sent by voice data from the browser apparatus, and providing the browser apparatus with the data to which the identifier is added.

According to the present invention, there is provided a recording medium recording a program which, in order to provide a browser apparatus with the contents of data provided on a network in a form of voice data, allows a computer to function as means for forming, on the basis of the data provided on the network, voice data indicating a part or the whole of the contents of the data, means for storing the formed voice data, means for forming data by adding to the data provided on the network an identifier indicating a location where the voice data is stored, and means for providing the browser apparatus with the data to which the identifier is added.

According to the present invention, there is provided a recording medium recording a program which, in order to permit a browser apparatus to respond by voice to data provided on a network, allows a computer to function as means for checking whether the contents of the data provided on the network have contents requiring a response from the browser apparatus, means for forming data by adding to the data provided on the network an identifier indicating a recipient of the response sent by voice data from the browser apparatus, and means for providing the browser apparatus with the data to which the identifier is added.

According to the present invention, there is provided a browser apparatus comprising means for inputting a voice, means for forming voice data on the basis of the input voice, and means for supplying the formed voice data to a recipient indicated by a given identifier.

According to the present invention, there is provided a data processing apparatus capable of communicating with a server and a browser apparatus via a network, comprising means for forming, on the basis of data provided by the server, voice data indicating a part or the whole of the contents of the data, means for storing the formed voice data, means for adding to the data provided by the server a first identifier indicating a location where the voice data is stored, means for checking whether the contents of the data provided by the server include a content requiring a response from the browser apparatus, means for further adding, when the contents of the data provided by the server have contents requiring a response, a second identifier indicating a recipient of the response to the data to which the first identifier is added, means for providing the browser apparatus with the data to which the first identifier or the first and second identifiers are added, recognizing means for performing voice recognition for voice data related to the response, when the voice data is supplied from the browser apparatus to the recipient, means for forming response data in a form suited to the server for receiving the response, on the basis of the recognition result by the recognizing means, and means for providing the response data to the server.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of client HTTP response data;

FIG. 4 is a view showing an example of client HTTP request data;

FIG. 7 is a view showing an example of HTTP response data;

FIG. 8 is a view showing an example of the data configuration of a next request holding unit 511 when the data shown in FIG. 7 is processed.

DETAILED DESCRIPTION OF THE PREFERRED EMBODIMENT

A preferred embodiment of the present invention will now be described in detail in accordance with the accompanying drawings.

Figure 1:
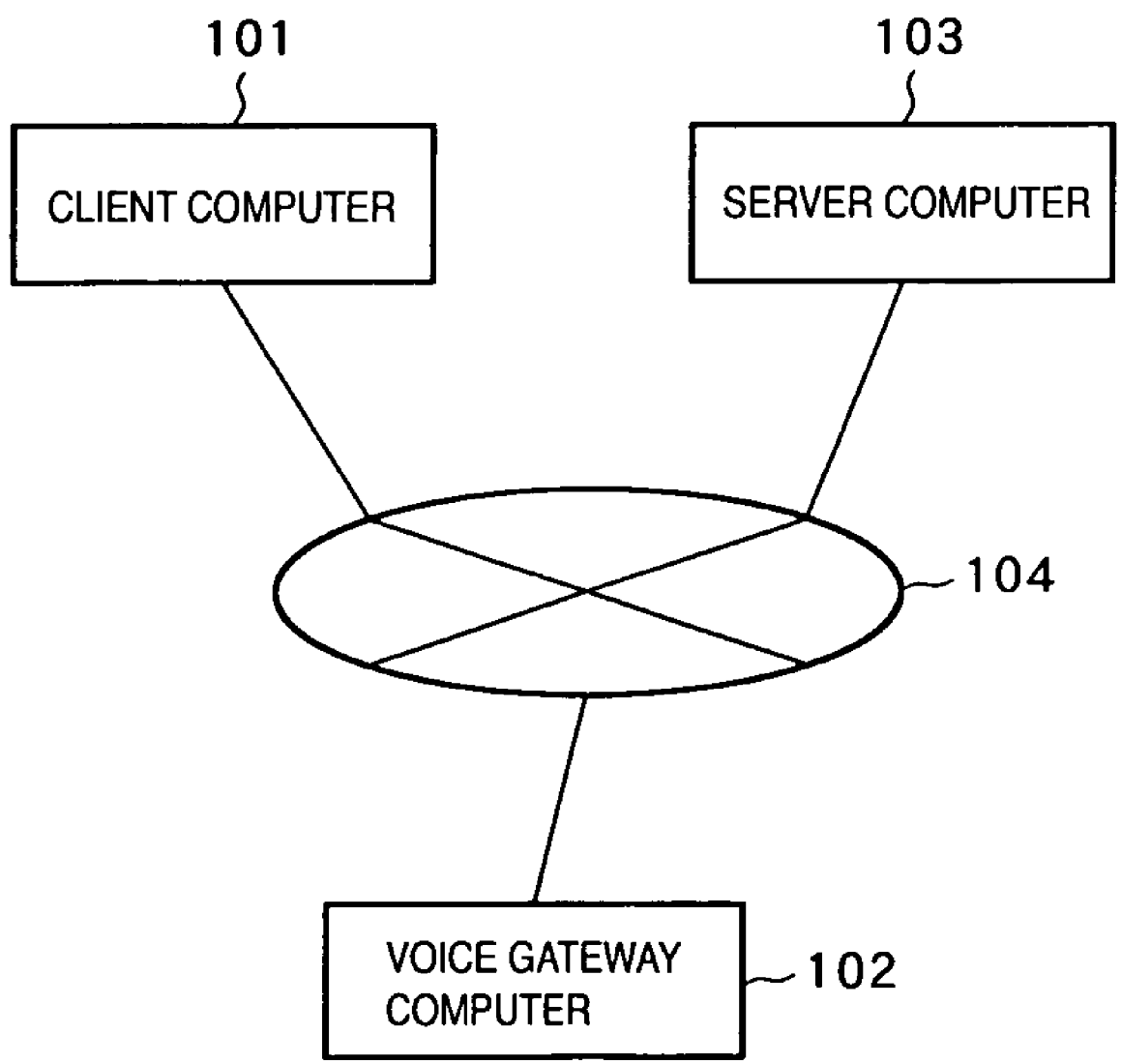
FIG. 1 is a view showing the configuration of a voice browser system according to an embodiment of the present invention.

FIG. 1 is a view showing the configuration of a voice browser system according to an embodiment of the present invention.

This voice browser system comprises a client computer 101, a server computer 103, and a voice gateway computer 102 connected to each other by a network 104. The client computer 101 serves as a browser apparatus. The server computer 103 provides information to the client computer 101. The voice gateway computer 102 provides the client computer 101 with information provided by the server computer 103 as voice data. The voice gateway computer 102 also realizes a request from the client computer 101 to the server computer 103 or response from the server computer 103 to the client computer 101 as voice data.

The client computer 101, the voice gateway computer 102, and the server computer 103 each have a communication device and can exchange HTTP message over TCP/IP across the network 104.

As the server computer 103, it is possible to use a conventional computer called a Web server, i.e., a computer which executes a Web server program for receiving an HTTP request and returning, as an HTTP response, data which matches the URL of the HTTP request.

The network 104 is, e.g., the Internet or an intranet.

In this voice browser system, the client computer 101 and the server computer 103 can communicate via the voice gateway computer 102.

In this specification, a request from the client computer 101 to the server computer 103 is called an HTTP request. In particular, a request from the client computer 101 to the voice gateway computer 102 is also called a client HTTP request, and a corresponding request from the voice gateway computer 102 to the server computer 103 is also called a server HTTP request.

Furthermore, an offer of information from the server computer 103 to the client computer 101 in response to an HTTP request is called an HTTP response. In particular, a response to the voice gateway computer 102 is also called a server HTTP response, and a corresponding response from the voice gateway computer 102 to the client computer 101 is also called a client HTTP response.

The details of the client computer 101 and the voice gateway computer 102 will be described below.

The client computer 101 includes input devices such as a display, keyboard, and mouse, and voice I/O devices such as a loudspeaker and microphone. This client computer 101 can display data described in HTML and provided by the server computer 103, can output a voice of voice data which represents the contents of the data provided by the server computer 103 and which is supplied from the voice gateway computer 102, and can form, or input by characters, a client HTTP request containing voice data.

Figure 2:
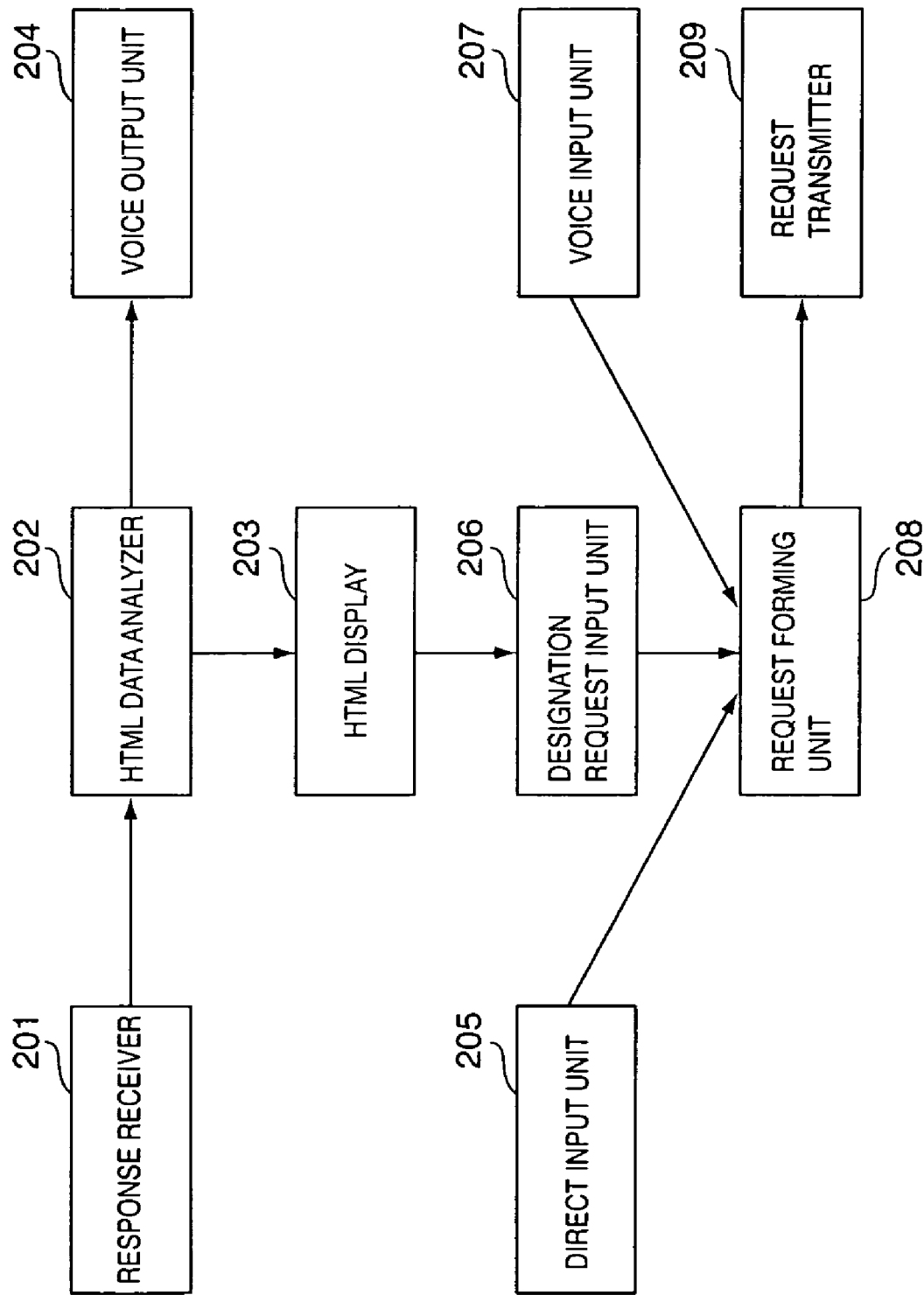
FIG. 2 is a block diagram showing the basic configuration of a client computer 101.

FIG. 2 is a block diagram showing the basic configuration of the client computer 101 which functions as a browser apparatus.

Referring to FIG. 2, a response receiver 201 receives an HTTP response. An HTML data analyzer 202 analyzes HTML data contained in the HTTP response received by the response receiver 201. An HTML display 203 displays data in accordance with the result of the analysis by the HTML data analyzer 202. A voice output unit 204 outputs a voice of voice data, if any, in accordance with the analytical result from the HTML data analyzer 202.

A direct input unit 205 accepts a user input from an input device such as a keyboard. A voice input unit 207 accepts a voice input. A designation request input unit 206 accepts an operation for designation with respect to information provided by the server computer 103 and displayed on the HTML display 203. A request forming unit 208 forms an HTTP request from one or the combination of inputs to the direct input unit 205, the designation request input unit 206, and the voice input unit 207. A request transmitter 209 transmits the HTTP request formed by the request forming unit 208.

The voice gateway computer 102 functions as a data processor. That is, the voice gateway computer 102 performs voice recognition if a client HTTP request transmitted from the client computer 101 contains voice data. On the basis of the recognition result, the voice gateway computer 102 forms and transmits a server HTTP request. Also, from HTML data contained in a server HTTP response transmitted from the server computer 103 in response to an HTTP request, the voice gateway computer 102 forms voice data whose voice is to be output from the client computer 101. The voice gateway computer 102 provides this voice data together with the HTML data to the client computer 101.

Figure 5:
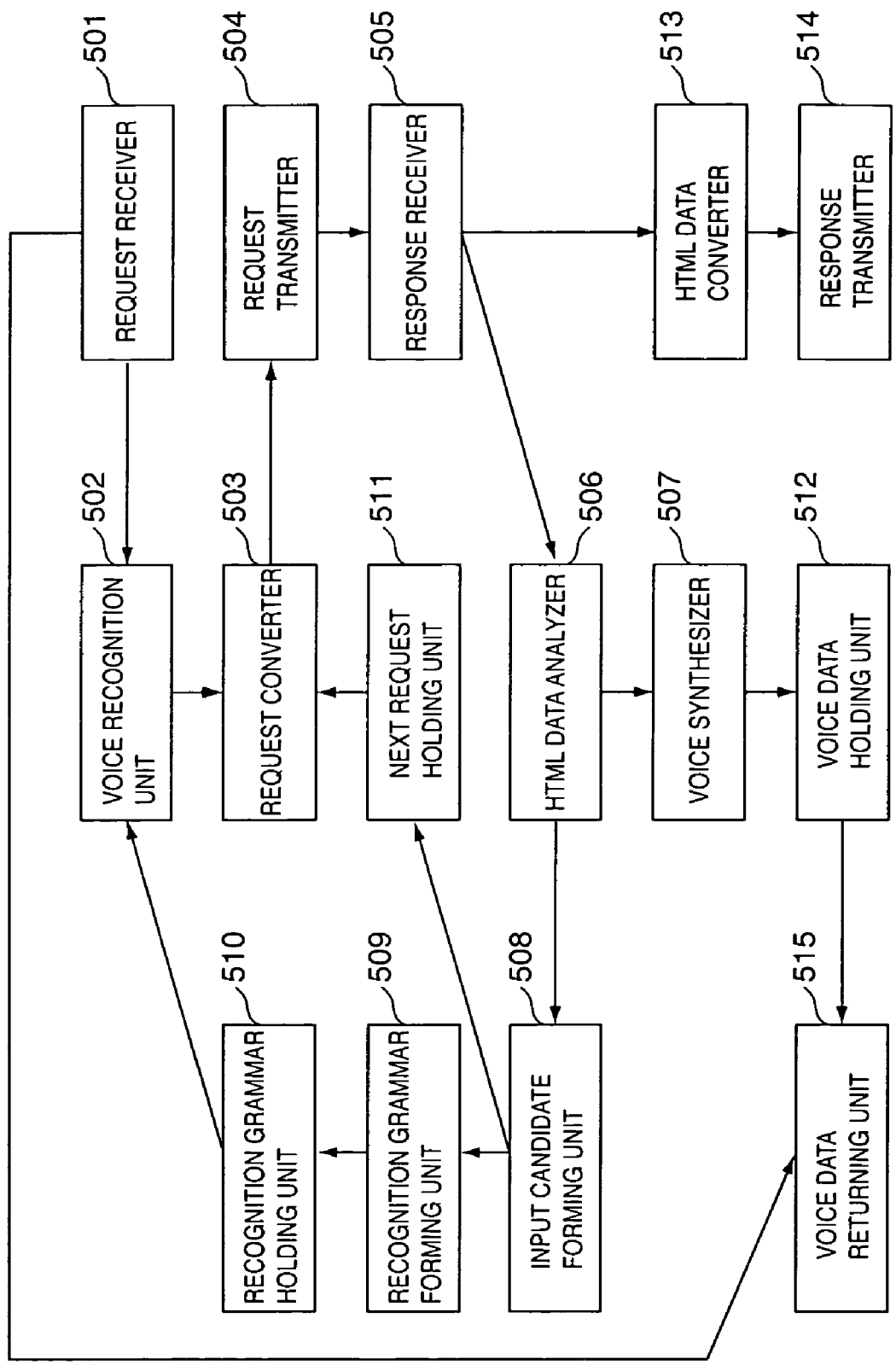
FIG. 5 is a block diagram showing the basic configuration of a voice gateway computer 102.

FIG. 5 is a block diagram showing the basic configuration of the voice gateway computer 102.

Referring to FIG. 5, a request receiver 501 receives a client HTTP request transmitted from the client computer 101. A voice recognition unit 502 performs voice recognition if the client HTTP request received by the request receiver 501 contains voice data. On the basis of the recognition result from the voice recognition unit 502, a request converter 503 converts the client HTTP request containing the voice data into a server HTTP request having a format suited to the server computer 103.

A request transmitter 504 transmits the server HTTP request to the server computer 103. If a corresponding client HTTP request contains voice data, the request transmitter 504 transmits the data converted by the request converter 503 to the server computer 103. If a corresponding client HTTP request does not contain any voice data, the request transmitter 504 transmits the data received by the request receiver 501 to the server computer 103. A response receiver 505 receives a server HTTP response in response to the server HTTP request transmitted by the request transmitter 504. An HTML data analyzer 506 analyzes HTML data contained in the server HTTP response received by the response receiver 505.

A voice synthesizer 507 forms voice data to be output as a voice by using the result of the analysis by the HTML data analyzer 506. By using the analytical result from the HTML data analyzer 506, an input candidate forming unit 508 forms a voice input candidate to be accepted next and forms a request to be formed when this candidate is input. That is, the input candidate forming unit 508 checks whether the information provided to the client computer 101 by the server computer 103 has contents which require a response from the client computer 101. If such contents exist, the input candidate forming unit 508 forms a candidate of the contents.

A recognition grammar forming unit 509 forms a voice recognition grammar to be used by the voice recognition unit 502, from the input candidate formed by the input candidate forming unit 508. A recognition grammar holding unit 510 holds the recognition grammar formed by the recognition grammar forming unit 509. A next request holding unit 511 holds a pair of an input candidate formed by the input candidate forming unit 508 and an HTTP request to be formed when a voice input corresponding to the input candidate is supplied.

A voice data holding unit 512 holds the voice data formed by the voice synthesizer 507. An HTML data converter 513 embeds a URL for acquiring the voice data held in the voice data holding unit 512 and a URL for activating the next voice recognition process, into the HTML data contained in the response data received by the response receiver 505.

A response transmitter 514 transmits the HTML data formed by the HTML data converter 513 as a client HTTP response to the client computer 101. If this client HTTP request received by the request receiver 501 is a request for the voice data held in the voice data holding unit 512, a voice data returning unit 515 returns this voice data as a client HTTP response to the client computer 101.

Figure 3:
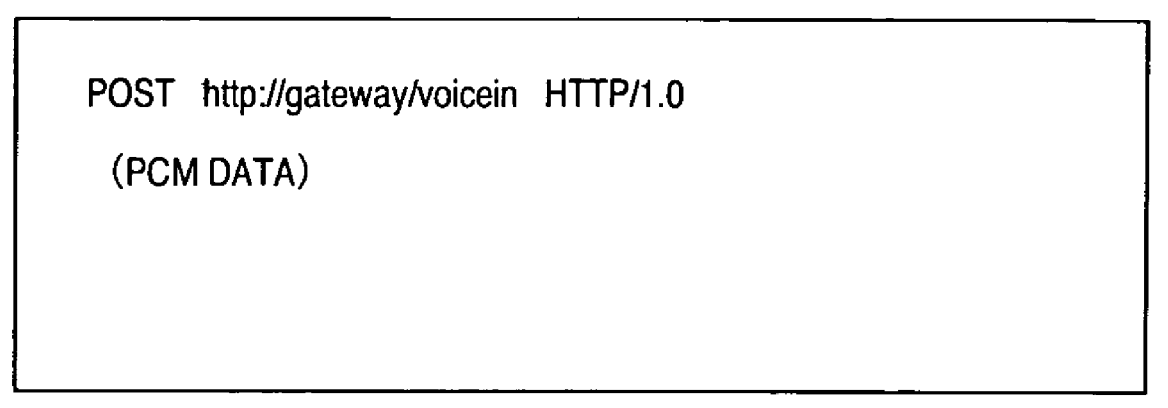

FIG. 3 shows an example of HTML data contained in a client HTTP response. In this embodiment, two extension tags, i.e., VOICEOUT and VOICEIN, are used in addition to the HTML specifications defined as HTML 4.0.

VOICEOUT is a tag as an identifier which indicates the storage location of voice data formed by the voice synthesizer 507, i.e., which indicates the voice data holding unit 512.

VOICEIN is a tag as an identifier which, when an HTTP request from the client computer 101 contains voice data, indicates the recipient of the data, i.e., indicates the request receiver 501.

When VOICEOUT appears, the client computer 101 acquires voice data in a URL designated by the attribute of VOICEOUT by issuing another HTTP request. The client computer 101 outputs the acquired voice data from a voice output device such as a loudspeaker.

The VOICEIN tag designates a base URL which is a base of an HTTP request to be formed when a voice is input to a voice input device such as a microphone of the client computer 101.

Processing in the client computer 101 will be explained below by using the above example.

The response receiver 201 receives an HTTP response containing the HTML data shown in FIG. 3, as an HTTP response to a certain HTTP request. The procedure of the reception is analogous to that of a conventional browser apparatus.

The HTML data analyzer 202 performs general HTML data analysis except that data necessary for operations are extracted even for the VOICEOUT and VOICEIN tags. The HTML display 203 displays information on the basis of the HTML data similar to a conventional browser apparatus.

When the VOICEOUT tag is analyzed, the voice output unit 204 transmits an HTTP request which requests voice data designated by a URL which is indicated by the attribute of the tag, and acquires voice data contained in the body of a corresponding HTTP response from the voice gateway computer 102.

The voice output unit 204 outputs the acquired voice data from a voice output device such as a loudspeaker.

If a voice is input to a voice input device such as a microphone, the voice input unit 207 A/D-converts the input to form voice data such as PCM data. Timings for determining the start and end points of this PCM data are determined by a period during which the voice input power exceeds a threshold value or by a period during which a certain key is pressed.

If there is an input to the voice input unit 207, the request forming unit 208 forms a POST request to the URL indicated as the attribute of the VOICEIN tag, on the basis of the result of the analysis by the HTML data analyzer 202. The request forming unit 208 places the PCM data formed by the voice input unit 207 into the body of the POST request. If a voice is input to the client computer 101 which is outputting the HTML data as shown in FIG. 3, an HTTP request is formed as shown in FIG. 4. The request transmitter 209 transmits the HTTP request formed by the request forming unit 208 to a computer designated by the URL of the request, i.e., to the post gateway computer 102.

Figure 6:
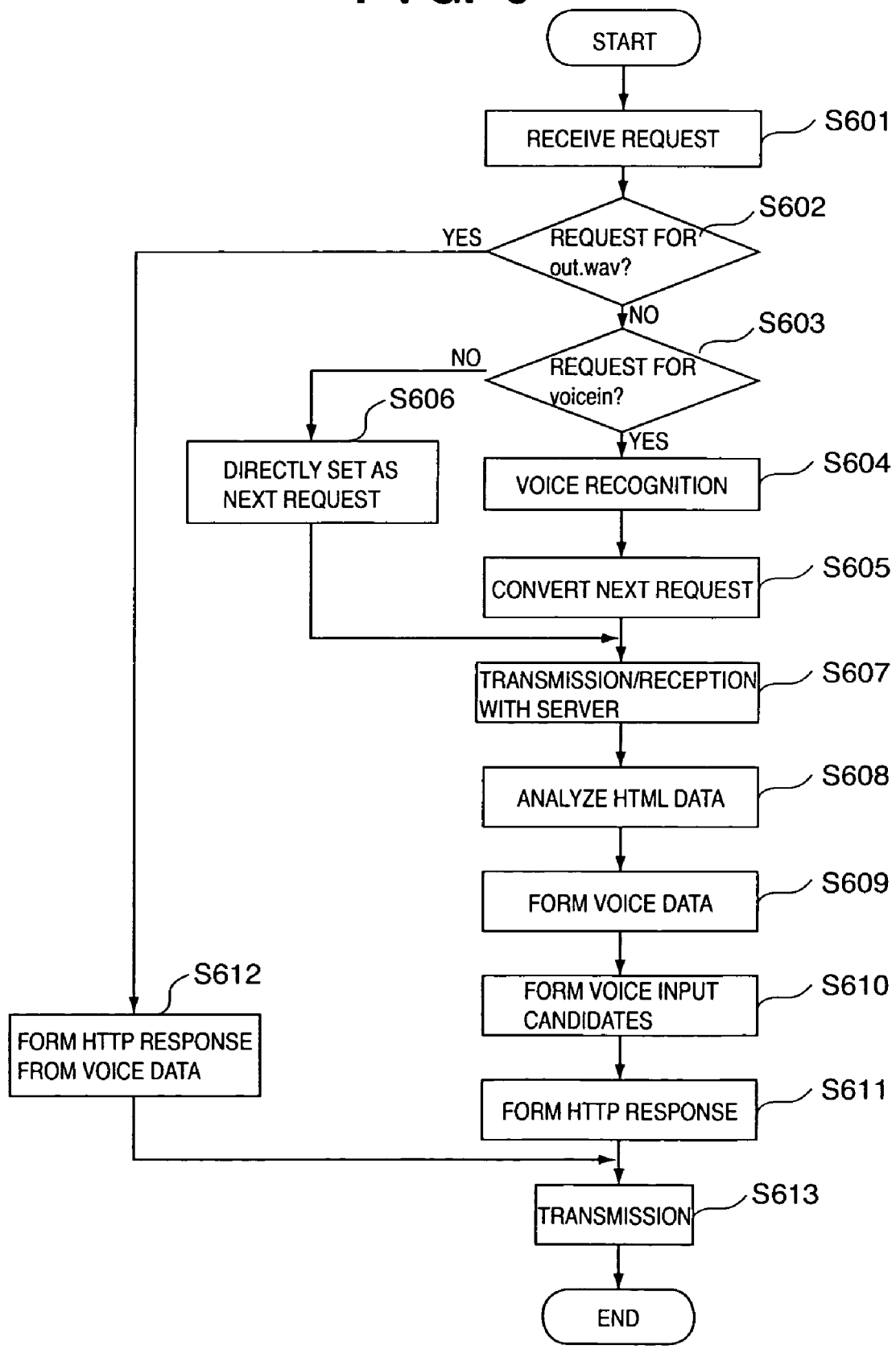
FIG. 6 is a flow chart showing processing in the voice gateway computer 102.

An outline of the processing in the voice gateway computer 102 will be described below with reference to a flow chart shown in FIG. 6.

In the main routine of this processing, the voice gateway computer 102 waits for a connection request to a port (usually a port No. 80, but it is not limited to this one) for receiving HTTP. When a connection request is issued from the client computer 101, the voice gateway computer 102 establishes a connection and starts the processing explained here. In this embodiment, the processing is accomplished by the same single thread as the waiting process for the sake of descriptive simplicity. However, this processing can also be realized by multithread. When this processing is completed, the flow returns to the port connection request waiting process.

In step S601, the voice gateway computer 102 receives an HTTP request from the client computer 101. The flow advances to step S602.

In step S602, the voice gateway computer 102 extracts the URL from the HTTP request data. If this URL indicates "/out.wav" of the voice gateway computer 102, the flow advances to step S613; if not, the flow advances to step S603.

In step S603, if the URL indicates "/voicein" of the voice gateway computer 102, the flow advances to step S604; if not, the flow advances to step S606.

In step S604, the voice gateway computer 102 extracts body of the HTTP request and performs voice recognition by using the extracted body as voice data. This voice recognition is done by using the recognition grammar held in the recognition grammar holding unit 510. The flow advances to step S605.

In step S605, the voice gateway computer 102 extracts the next HTTP request corresponding to the result recognized in step S604 from the next request holding unit 511. The flow advances to step S607.

In step S606, the voice gateway computer 102 sets the URL of the HTTP request sent from the client computer 101 as the next HTTP request. The flow advances to step S607.

In step S607, the voice gateway computer 102 transmits the next HTTP request to the server (server computer 103) indicated by the host portion in the URL of the next HTTP request, and obtains an HTTP response. This operation is identical with that of a conventional proxy apparatus. The flow then advances to step S608. FIG. 7 is a view showing an example of the HTTP response data.

In step S608, the voice gateway computer 102 analyzes HTML data in the body of the HTTP response (server HTTP response) received in step S607. This analysis makes it possible to extract the tree structure and elements of each tag in the HTML data. The flow advances to step S609.

In step S609, the voice gateway computer 102 uses the analytical result in step S608 to form voice data whose voice is to be output from the client computer 101. That is, the voice gateway computer 102 forms voice data by performing voice synthesis for some or all texts in the HTML data. A text to be subjected to this voice synthesis can be arbitrarily determined. In this embodiment, it is assumed, for the sake of simplicity, that voice synthesis is performed for the first P tag element. In the data example shown in FIG. 7, synthetic voice data "Select product type." is formed. This synthetic voice data is stored as a WAVE-format file in a location looked up by "/out.wav". The flow advances to step S610.

In step S610, the voice gateway computer 102 outputs this HTML data and the voice data to the client computer 101, and, on the basis of the contents of these data, forms voice input candidates for a response to be accepted from the client computer 101. A voice input to be accepted can be arbitrarily determined. In this embodiment, elements of OPTION tags in a SELECT tag are adopted as the input candidates for the sake of simplicity. In the example shown in FIG. 7, the input candidates are "Copy", "Printer", and "Fax".

The voice gateway computer 102 forms a recognition grammar for recognizing each word of the input candidates. In addition, as the next HTTP request when each element is input as a voice, the voice gateway computer 102 forms a request URL generated when the corresponding SELECT tag is selected and the form is submitted, and holds this request URL in the next request holding unit 511.

FIG. 8 shows an example of the data configuration in the next request holding unit 511, when the data shown in FIG. 7 is processed. Referring to FIG. 8, each row corresponds to one input candidate. A column 801 holds character strings of input candidates. A column 802 holds the URLs of the next HTTP requests. The flow then advances to step S611.

In step S611, the voice gateway computer 102 embeds the VOICEOUT tag and VOICEIN tag in this HTML data. In this embodiment, the URLs of these tags are fixed, so the same tag patterns are always embedded. The voice gateway computer 102 sets the HTML data in which the tags are embedded as a client response, and the flow advances to step S613.

In step S612, the voice gateway computer 102 forms a client response related to the voice data stored in step S609 of the immediately preceding processing, and the flow advances to step S613.

In step S613, the voice gateway computer 102 provides the formed client HTTP response to the client computer 101. After that, the voice gateway computer 102 disconnects from the client computer 101 and completes the processing.

Figure 9:
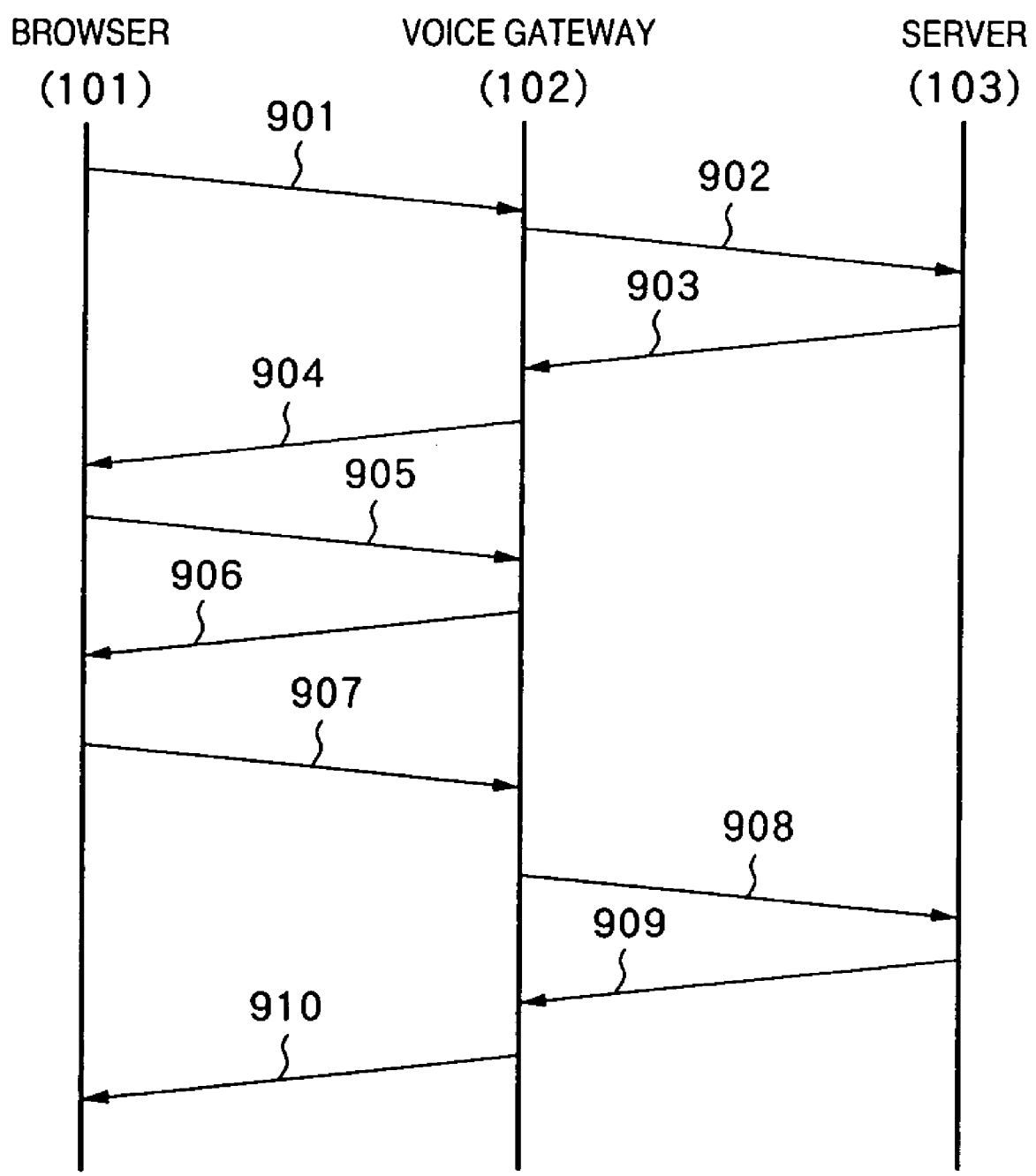
FIG. 9 is a view showing a communication example between computers according to the embodiment of the present invention.

An example of communication between the individual computers in this embodiment will be described with reference to FIG. 9.

Initially, a URL is directly input to the client computer 101 (browser), and a client HTTP request for http://server/index.html is sent to the voice gateway computer 102 (901). Note that this URL is not always directly input; the URL is sometimes input by transmitting an HTTP request for the URL by designating an object having this URL as an anchor on the browser display screen. The transmission is similar to that of a conventional browser apparatus.

Since the HTTP request is for the URL of the server 103, the voice gateway computer 102 sends to the server 103 a new server HTTP request for /index.html, similar to a conventional proxy apparatus (902).

The server 103 returns to the voice gateway computer 102 a server HTTP response containing data indicated by /index.html in its body (903). FIG. 7 shows an example of this HTTP response.

On the basis of the received server HTTP response, the voice gateway computer 102 forms voice data and input candidates and returns to the client computer 101 a client HTTP response containing, in its body, HTML data (e.g., FIG. 4) in which new tags are embedded (904).

The client computer 101 displays the HTML data contained in the body of the received client HTTP response, and sends to the voice gateway computer 102 a client HTTP request for voice data (in the example shown in FIG. 4, http://gateway.out.wav) indicated by the VOICEOUT tag (905).

The voice gateway computer 102 returns the voice data indicated by out.wav to the client computer 101 (906). This voice data is formed and stored before the client HTTP response (904) is provided.

If a voice is input to the client computer 101, a client HTTP request (POST request) containing the voice data in its body is sent from the client computer 101 to the voice gateway computer 102 (907). For example, the data shown in FIG. 3 is transmitted.

The voice gateway computer 102 performs voice recognition for the voice data contained in the body of the received POST request. If the voice data is recognized as "copy", the voice gateway computer 102 sends to the server 103 a server HTTP request for /cgi!?category=copy, in accordance with the contents of the next request holding unit 511 (908). A recognition grammar and the contents of the next request holding unit 511 used in this processing are formed before the previous response (904) is formed.

In accordance with the received server HTTP request, the server 103 activates a CGI program and returns a server HTTP response to the voice gateway computer 102 (909).

In the same manner as when receiving the response 903, the voice gateway computer 102 newly forms voice data and a recognition grammar and returns a client HTTP response to the client computer 101 (910).

In the voice browser system of this embodiment as described above, only the browser (client computer 101), the voice gateway (voice gateway computer 102), and the server (server 103) exist, so communications need only be performed between them. Therefore, it is possible to display data provided by the server and to input or output a voice corresponding to that data in a common communication process. This simplifies the communication management. In addition, all communications can be performed by HTTP. Hence, communications can be performed without any problems even when fire walls which generally transmit only HTTP are present between the browser, voice gateway, and server.

In the above embodiment, the browser, voice gateway, and server are implemented by the three computers, i.e., the client computer, voice gateway computer, and server computer. However, the present invention is not limited to this embodiment. For example, both the voice gateway and server can also be implemented by a single computer.

Also, in the above embodiment, one browser apparatus, one voice gateway apparatus, and one server are connected to the network. However, a plurality of browser apparatuses, voice gateway apparatuses, and/or server apparatuses can also be connected, and any arbitrary apparatus can be used in accordance with data to be requested.

In the above embodiment, one VOICEOUT tag and one VOICEIN tag are added as identifiers in the voice gateway computer 102. However, a plurality of VOICEOUT tags and/or VOICEIN tags can also be added, and one or both of these two types of tags need not be added. When a plurality of VOICEOUT tags are to be added, different URLs for designating voice data are used. When a plurality of VOICEIN tags are to be added, a plurality of recognition grammares and a plurality of next HTTP request data are prepared, and different URLs for designating the attributes of VOICEIN are used. When requests containing voice data are sent by these URLs, the plurality of recognition grammars and the plurality of next HTTP request data prepared are used by discriminating between them by using the URLs.

In the above embodiment, synthetic voice data is transferred by a WAVE format, and input voice data is transferred as raw PCM data. However, any arbitrary voice format can also be used. When a plurality of voice formats are to be permitted, data indicating a voice format is described in a tag attribute or in an HTTP header.

Tag names and attribute names are not restricted to those used in the above embodiment, so some other names can be used. Also, data expressed by an attribute can be expressed by a tag, or data expressed by a tag can be expressed by an HTTP header. That is, arbitrary extension of HTTP and HTML can be used.

Furthermore, data and programs are not limited to HTML and HTTP; it is possible to use data described in another markup language or to use another protocol. For example, voice embedding and voice recognition analogous to the above embodiment can also be performed for data described in WML by using WAP.

The above embodiment is achieved by a logic circuit for implementing a part or the whole of the above-mentioned function, as well as by running a software program which implements the function.

The preferred embodiment of the present invention has been explained above. However, the object of the present invention can also be achieved by supplying a storage medium storing program codes of software for implementing the function of the above embodiment to a system or an apparatus, and reading out and executing the program codes stored in the storage medium by a computer (or a CPU or MPU) of the system or apparatus. In this case, the program codes read out from the storage medium implement the function of the present invention, and the storage medium storing these program codes constitutes the invention. Also, besides the function of the above embodiment is implemented by executing the readout program codes by the computer, the present invention includes a case where an OS (Operating System) or the like running on the computer performs a part or the whole of actual processing in accordance with designations by the program codes and thereby implements the function of the above embodiment.

Furthermore, the present invention also includes a case where, after the program codes read out from the storage medium are written in a memory of a function extension board inserted into the computer or of a function extension unit connected to the computer, a CPU or the like of the function extension board or function extension unit performs a part or the whole of actual processing in accordance with designations by the program codes and thereby implements the function of the above embodiment.

As many apparently widely different embodiments of the present invention can be made without departing from the spirit and scope thereof, it is to be understood that the invention is not limited to the specific embodiments thereof except as defined in the claims.

What is claimed is:

1. A data processing apparatus capable of communicating with a server and a browser apparatus via a network, comprising:
   means for obtaining data from the server according to a request from the browser apparatus;
   means for creating synthetic voice data indicating a part or the whole of the contents of the obtained data;
   means for storing the synthetic voice data;
   means for forming data by adding to the obtained data an identifier which is comprised of text data and which indicates a location where the synthetic voice data is stored; and
   means for providing said browser apparatus with the formed data.

2. The apparatus according to claim 1, wherein the obtained data is described in a markup language, and the identifier is added to the obtained data as a tag corresponding to the markup language.

3. A browser system comprising a browser apparatus, a server, and a data processing apparatus capable of communicating with said browser apparatus and said server via a network, wherein said data processing apparatus comprises:
   means for obtaining data from the server according to a request from the browser apparatus;
   means for creating synthetic voice data indicating a part or the whole of the contents of the obtained data;
   means for storing the synthetic voice data;
   means for forming data by adding to the obtained data an identifier which is comprised of text data and which indicates a location where the synthetic voice data is stored; and
   means for providing said browser apparatus with the formed data,
   wherein said browser apparatus comprises means for acquiring the synthetic voice data from the location indicated by the identifier and outputting a voice related to the synthetic voice data.

4. The system according to claim 3, wherein the obtained data is described in a markup language, and the identifier is added to the obtained data as a tag corresponding to the markup language.

5. A data processing method of a data processing apparatus capable of communicating with a server and a browser apparatus via a network, said method comprising the steps of:
   obtaining data from the server according to a request from the browser apparatus;
   creating synthetic voice data indicating a part or the whole of the contents of the obtained data;
   storing the synthetic voice data;
   forming data by adding to the obtained data an identifier which is comprised of text data and which indicates a location where the synthetic voice data is stored; and
   providing the browser apparatus with the formed data.

6. The method according to claim 5, wherein the obtained data is described in a markup language, and the identifier is added to the obtained data as a tag corresponding to the markup language.

7. A recording medium recording having program instructions recorded thereon to allow a computer capable of communicating with a server and a browsers apparatus via a network to function as:
   means for obtaining data from the server according to a request from the browser apparatus;
   means for creating synthetic voice data indicating a part or the whole of the contents of the obtained data;
   means for storing the synthetic voice data;
   means for forming data by adding to the obtained data an identifier which is comprised of text data and which indicates a location where the synthetic voice data is stored; and
   means for providing the browser apparatus with the formed data.

8. The medium according to claim 7, wherein the obtained data provided on said network is described in a markup language, and the identifier is added to the obtained data as a tag corresponding to the markup language.

* * * * *

UNITED STATES PATENT AND TRADEMARK OFFICE
CERTIFICATE OF CORRECTION

PATENT NO. : 7,251,602 B2  Page 1 of 1
APPLICATION NO. : 09/817345
DATED : July 31, 2007
INVENTOR(S) : Ito et al.

It is certified that error appears in the above-identified patent and that said Letters Patent is hereby corrected as shown below:

TITLE PAGE:
Item (56) Foreign Patent Documents, "EP 0 878 948 A2  11/1998" should be deleted (duplicate).

COLUMN 3:
Line 12, "by" should read -- by the --.

COLUMN 10:
Line 53, "grammares" should read -- grammars --.

COLUMN 12:
Line 43, "recording" (second occurrence) should be deleted.

Signed and Sealed this

Fifteenth Day of April, 2008

JON W. DUDAS
*Director of the United States Patent and Trademark Office*